United States Patent [19]

Watanabe

[11] Patent Number: 5,960,771
[45] Date of Patent: Oct. 5, 1999

[54] METHOD AND DEVICE FOR CONTROLLING THE VOLUME OF INTAKE AIR FOR AN ENGINE

[75] Inventor: Shinji Watanabe, Tokyo, Japan

[73] Assignee: Mitsubishi Denki Kabushiki Kaisha, Tokyo, Japan

[21] Appl. No.: 09/092,991

[22] Filed: Jun. 8, 1998

[30] Foreign Application Priority Data

Nov. 19, 1997 [JP] Japan .................................. 9-318567

[51] Int. Cl.$^6$ ....................................................... F02D 9/02
[52] U.S. Cl. ........................ 123/396; 123/399; 123/479
[58] Field of Search .................................. 123/399, 396, 123/361, 400, 403, 479; 701/114

[56] References Cited

U.S. PATENT DOCUMENTS

| | | | |
|---|---|---|---|
| 4,519,360 | 5/1985 | Murakami .............................. | 123/399 |
| 5,163,402 | 11/1992 | Taguchi et al. ....................... | 123/361 |
| 5,339,782 | 8/1994 | Golzer et al. ......................... | 123/399 |
| 5,429,092 | 7/1995 | Kamei .................................... | 123/399 |
| 5,447,134 | 9/1995 | Yokoyama ............................ | 123/399 |
| 5,553,581 | 9/1996 | Hirabayashi et al. ................. | 123/399 |
| 5,602,732 | 2/1997 | Nichols et al. ....................... | 123/399 |
| 5,823,164 | 10/1998 | Seki et al. ............................ | 123/396 |

FOREIGN PATENT DOCUMENTS

| | | |
|---|---|---|
| 59-65520 | 4/1984 | Japan . |
| 6-94820 | 11/1994 | Japan . |

*Primary Examiner*—Willis R. Wolfe
*Assistant Examiner*—Hieu T. Vo
*Attorney, Agent, or Firm*—Sughrue, Mion, Zinn, Macpeak & Seas, PLLC

[57] ABSTRACT

One of a plurality of preset opening states the output voltage of each of first and second accelerator opening detection units is in and the continuation time of the opening state are judged, failures of the first and second accelerator opening detection units are judged according to judging conditions which are based on the opening state and the continuation time of the opening state, and the throttle valve is controlled based on the result of the judgment.

12 Claims, 4 Drawing Sheets

| | OPENING STATE | | CRITICAL CONTINUA- TION TIME | APS STATE | |
|---|---|---|---|---|---|
| | Vaps 1 | Vaps 2 | | 1 | 2 |
| J1 | Z4 | — | $t_4$ | FAILURE | — |
| J2 | Z1 | Z3 | $t_1$ | ABNORMAL | NORMAL |
| J3 | Z1 | Z3 | $t_2$ | FAILURE | NORMAL |
| J4 | Z2 Z3 | Z4 | $t_4$ | NORMAL | FAILURE |
| J5 | Z3 | Z1 | $t_2$ | NORMAL | FAILURE |

— ~ NO JUDGMENT , $t_1 < t_2$

| | OPENING STATE | | CRITICAL CONTINUA-TION TIME | APS STATE | |
|---|---|---|---|---|---|
| | Vaps 1 | Vaps 2 | | 1 | 2 |
| J1 | Z4 | — | $t_4$ | FAILURE | — |
| J2 | Z1 | Z3 | $t_1$ | ABNORMAL | NORMAL |
| J3 | Z1 | Z3 | $t_2$ | FAILURE | NORMAL |
| J4 | Z2 Z3 | Z4 | $t_4$ | NORMAL | FAILURE |
| J5 | Z3 | Z1 | $t_2$ | NORMAL | FAILURE |

— ~ NO JUDGMENT, $t_1 < t_2$

METHOD AND DEVICE FOR CONTROLLING THE VOLUME OF INTAKE AIR FOR AN ENGINE

BACKGROUND OF THE INVENTION

1. Field of the Invention

This invention relates to the control of the volume of intake air for an engine by controlling the opening of a throttle valve provided in an inlet pipe for a car engine. More specifically, it relates to a method and device for controlling the volume of intake air for an engine having two accelerator opening detection means for detecting the operation amount of an accelerator.

2. Description of the Prior Art

In a general car engine control device, a throttle valve is provided in an inlet passage for sucking air to be supplied to an engine and opens or closes in response to the operation of an accelerator by a driver to control the volume of intake air for the engine in accordance with the operation amount of the accelerator. The control of the volume of intake air for the engine can be achieved by connecting the throttle valve and the accelerator by mechanical connection means such as a link or wire. However, in a connection method using such mechanical connection means, the relationship between the operation amount of the accelerator and the opening of the throttle valve is fixed, there is no freedom in the control of the throttle valve, and the positional relationship between the throttle valve and the accelerator is restricted, whereby the installation position of the connection means is limited when installed on an automobile.

A constant-speed running control device, traction control device and the like have recently been installed on an automobile to automatically control the running of the automobile. Therefore, the throttle valve must be controlled independently of the operation of the accelerator by the driver, and the control of the throttle valve is carried out by electrically connecting the throttle valve to a motor or the like. When the throttle valve and the accelerator are not interconnected by mechanical connection means, an accelerator position detection sensor is provided near the accelerator to detect the operation amount of the accelerator by the driver, and the throttle valve is controlled based on the detected operation amount of the accelerator.

Since an electronic control device for an automobile has a larger number of parts than the case where mechanical connection means is used, failure probability increases. Therefore, to ensure safety driving, various safety measures such as the detection of a failure are taken. Particularly, in a device for controlling the volume of intake air for an engine which drives and controls the throttle valve with an electric signal, the detection of a failure of an accelerator position detection sensor is a serious problem and a failure of the accelerator position detection sensor causes an abnormal rise in engine speed or abnormal acceleration of a vehicle.

To cope with these problems, Examined Japanese Patent Publication No. Hei 6-94820 discloses a method for detecting a failure of an accelerator position detection sensor which checks if an accelerator position signal is appropriate with two position sensors for outputting a signal indicative of the position of the accelerator. In the first invention of the publication, a first position sensor composed of a potentiometer and a second position sensor composed of an accelerator switch are provided, the second detection sensor generates a switching signal when it detects the operation of the accelerator, and an error signal is generated when the output value of the first position sensor is not between two different threshold values larger than an idle value when this switching signal is generated. In the second invention, the first position sensor and the second position sensor are composed of a potentiometer, and an error signal is generated when a difference between the output value of the first position sensor and the output value of the second position sensor exceeds a predetermined maximum value.

However, since it is difficult to specify a malfunctioning sensor by the detection of a failure of the accelerator position detection sensor, it is impossible to judge which output signal value from the accelerator position detection sensors is used to set the target opening of the throttle valve at the time of emergency driving after the judgment of a failure to ensure safety driving. Therefore, safety cannot be ensured. To specify a malfunctioning sensor, it is conceivable to install at least one additional sensor. This may cause such problems as growth in failure rate due to an increase in the number of parts, complicated failure judgment logic and a cost increase due to the addition of a sensor.

SUMMARY OF THE INVENTION

The present invention has been made to solve the above problems and it is an object of the present invention to provide a method and device for controlling the volume of intake air for an engine which are capable of specifying malfunctioning one out of two accelerator opening detection means in a short period of time with accuracy to eliminate an abnormal rise in engine speed and abnormal acceleration of a vehicle to ensure safety at the time of emergency driving.

According to a first aspect of the present invention, there is provided a method for controlling the volume of intake air for an engine which comprises judging which one of a plurality of opening states classified according to a plurality of preset reference voltages the output of each of first and second accelerator opening detection means for detecting the opening of an accelerator is in, and controlling the opening of a throttle valve based on an output value of the second accelerator opening detection means in place of an output value of the first accelerator opening detection means when a continuation time during which the output of the first accelerator opening detection means is in an opening state higher in voltage than a first predetermined opening state and the output of the second accelerator opening detection means is in a second opening state lower in voltage than the first opening state reaches a preset reference time.

According to a second aspect of the present invention, there is provided a device for controlling the volume of intake air for an engine which comprises opening judging means for judging which one of a plurality of opening states classified according to a plurality of preset reference voltages the output of each of the first and second accelerator opening detection means for detecting the opening of an accelerator is in and continuation time judging means for judging whether the continuation time of the opening state of the output of each of the first and second accelerator opening detection means reaches a preset reference time, wherein the opening of a throttle valve is controlled based on an output value of the second accelerator opening detection means in place of an output value of the first accelerator opening detection means when a continuation time during which the output of the first accelerator opening detection means is in an opening state higher in voltage than a first predetermined opening state and the output of the second accelerator opening detection means is in a second opening state lower in voltage than the first opening state reaches the above reference time.

According to a third aspect of the present invention, there is provided a device for controlling the volume of intake air for an engine, wherein a second reference time longer than the above reference time is provided so that it is judged that the first accelerator opening detection means malfunctions when a continuation time during which the output of the first accelerator opening detection means is in an opening state higher than the first opening state and the output of the second accelerator opening detection means is in the second opening state reaches the above second reference time.

According to a fourth aspect of the present invention, there is provided a device for controlling the volume of intake air for an engine, wherein a third reference time is provided so that it is judged that the first accelerator opening detection means malfunctions when a continuation time during which the output of the first accelerator opening detection means is in an opening state lower than a third opening state which is lower in voltage than the second opening state reaches the above third reference time.

According to a fifth aspect of the present invention, there is provided a device for controlling the volume of intake air for an engine, wherein when the failure judging means judges that the first accelerator opening detection means malfunctions, the throttle control means controls the opening of the throttle valve based on a value obtained by multiplying an output value of the second accelerator opening detection means by a preset correction factor.

According to a sixth aspect of the present invention, there is provided a device for controlling the volume of intake air for an engine, wherein a fourth reference time is provided so that it is judged that the second accelerator opening detection means malfunctions when a continuation time during which the output of the second accelerator opening detection means is in an opening state higher than the first opening state and the output of the first accelerator opening detection means is in the second opening state reaches the above fourth reference time.

According to a seventh aspect of the present invention, there is provided a device for controlling the volume of intake air for an engine, wherein a fifth reference time is provided so that it is judged that the second accelerator opening detection means malfunctions when a continuation time during which the output of the second accelerator opening detection means is in an opening state lower than the third opening state which is lower in voltage than the second opening state reaches the above fifth reference time.

According to an eighth aspect of the present invention, there is provided a device for controlling the volume of intake air for an engine, wherein when the failure judging means judges that the second accelerator opening detection means malfunctions, the throttle control means controls the opening of the throttle valve based on a value obtained by multiplying an output value of the first accelerator opening detection means by a second preset correction factor.

According to a ninth aspect of the present invention, there is provided a device for controlling the volume of intake air for an engine, wherein a reference output difference and a sixth reference time are provided so that it is judged that both the first accelerator opening detection means and the second accelerator opening detection means are abnormal when a continuation time during which an output value of the first accelerator opening detection means and an output value of the second accelerator opening detection means are both in the second opening state and a difference between the output value of the first accelerator opening detection means and the output value of the second accelerator opening detection means is equal to or larger than the above reference output difference reaches the above sixth reference time, and the opening of the throttle valve is controlled based on a value obtained by multiplying the total of the output value of the first accelerator opening detection means and the output value of the second accelerator opening detection means by a third preset correction factor.

According to a tenth aspect of the present invention, there is provided a device for controlling the volume of intake air for an engine, wherein a reference output difference, a reference output value variation width and a seventh reference time are provided so that it is judged that both the first and second opening detection means are abnormal when a continuation time during which an output value of the first accelerator opening detection means and an output value of the second accelerator opening detection means are both in the second opening state, a difference between the output value of the first accelerator opening detection means and the output value of the second accelerator opening detection means is equal to or larger than the above reference output difference, and one or both of the output value variation width of the first accelerator opening detection means and the output value variation width of the second accelerator opening detection means is/are equal to or smaller than the above output value variation width reaches the above seventh reference time, and the opening of the throttle valve is controlled based on a value obtained by multiplying the total of the output value of the first accelerator opening detection means and the output value of the second accelerator opening detection means by a third preset correction factor.

According to an eleventh aspect of the present invention, there is provided a device for controlling the volume of intake air for an engine, wherein the reference voltage is divided into a maximum opening voltage, stable opening voltage and minimum opening voltage, the first opening state is a state in which voltage is higher than the above maximum opening voltage, the second opening state is a state in which voltage is higher than the above minimum opening voltage and lower than the stable opening voltage, and the third opening state is a state in which voltage is lower than the minimum opening voltage.

According to a twelfth aspect of the present invention, there is provided a device for controlling the volume of intake air for an engine, wherein failure alarm means is provided so that a driver is warned of a failure of the device.

The above and other objectives, features and advantages of the invention will become more apparent from the following description when taken in conjunction with the accompanying drawings.

DETAILED DESCRIPTION OF THE PREFERRED EMBODIMENTS

Preferred embodiments of the present invention will be described hereinafter with reference to the accompanying drawings.

Embodiment 1

Figure 1:
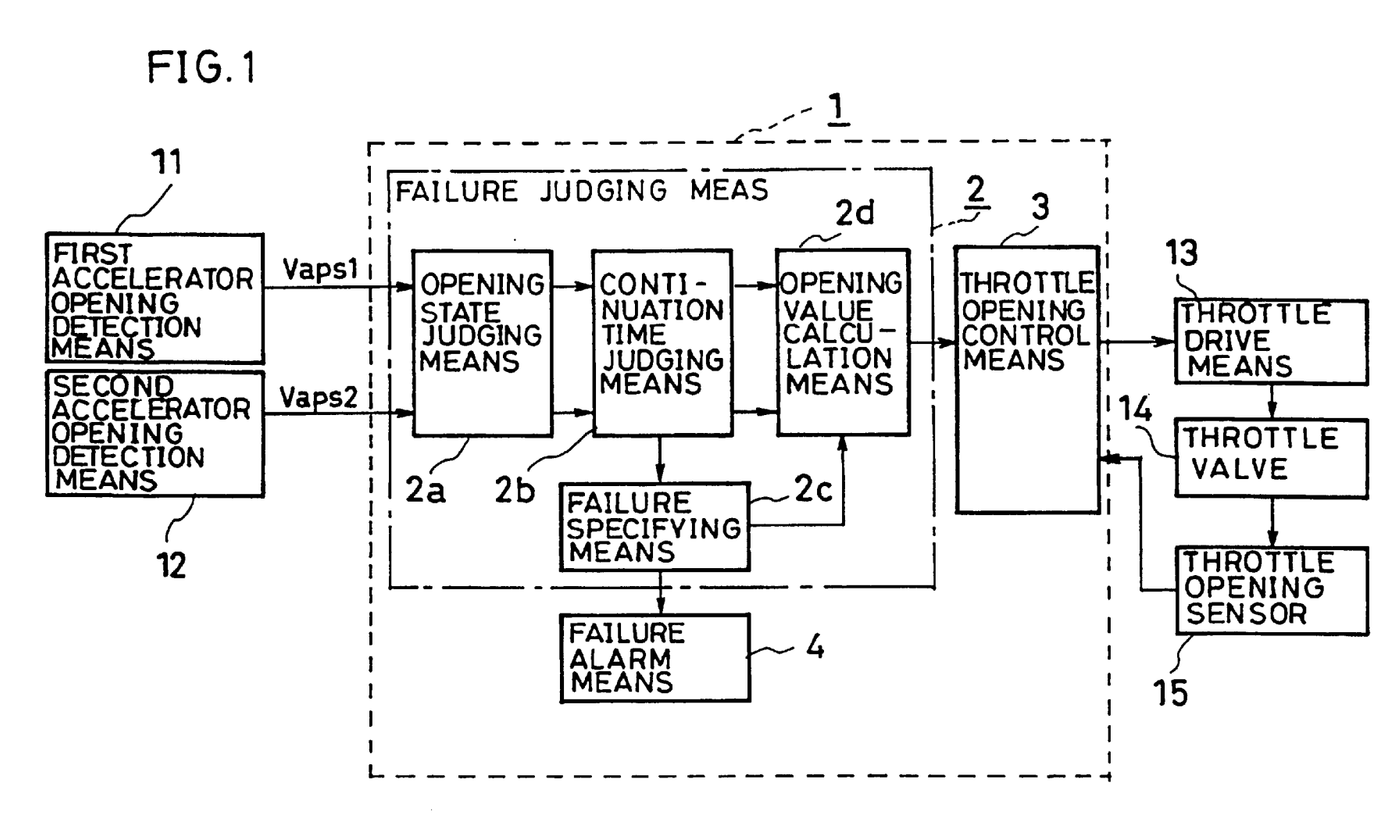
FIG. 1 is a block diagram showing the configuration of a device for controlling the volume of intake air for an engine according to the present invention.

FIG. 1 shows the configuration of a throttle valve control system comprising a device for controlling the volume of intake air for an engine according to Embodiment 1 of the present invention. Reference numeral 1 denotes the device for controlling the volume of intake air for an engine, 11 and 12 first and second accelerator opening detection means, composed of a position sensor such as a potentiometer, for detecting the operation amount of an unshown accelerator, respectively, 13 throttle drive means composed of a DC motor, 14 a throttle valve provided in an inlet pipe for an unshown engine, and 15 a throttle opening sensor for detecting the opening of the throttle valve.

The device 1 for controlling the volume of intake air for an engine comprises failure judging means 2 for judging failures of the first and second accelerator opening detection means 11 and 12, throttle opening control means 3 for controlling the opening of the throttle valve 14 to a target opening by controlling the throttle drive means 13, and failure alarm means 4 for alarming a driver of failures of the first and second accelerator opening detection means 11 and 12.

The above failure judging means 2 comprises opening state judging means 2a for judging which ones out of a plurality of opening states classified according to a plurality of preset reference voltages detection signals $V_{aps1}$ and $V_{aps2}$ from the first and second accelerator opening detection means 11 and 12 correspond to, continuation time judging means 2b for judging whether the continuation time of the opening state of the output of each of the first and second accelerator opening detection means reaches a preset reference time, failure specifying means 2c for specifying failure states of the first and second accelerator opening detection means 11 and 12 based on the result of judgment of the opening state judging means 2a and the result of judgment of the continuation time judging means 2b, and opening value calculation means 2d for calculating a value of accelerator opening voltage $V_{aps}$ (opening value) to be output to the throttle opening control means 3 in accordance with failure states specified by the above failure specifying means 2c.

Figure 2:
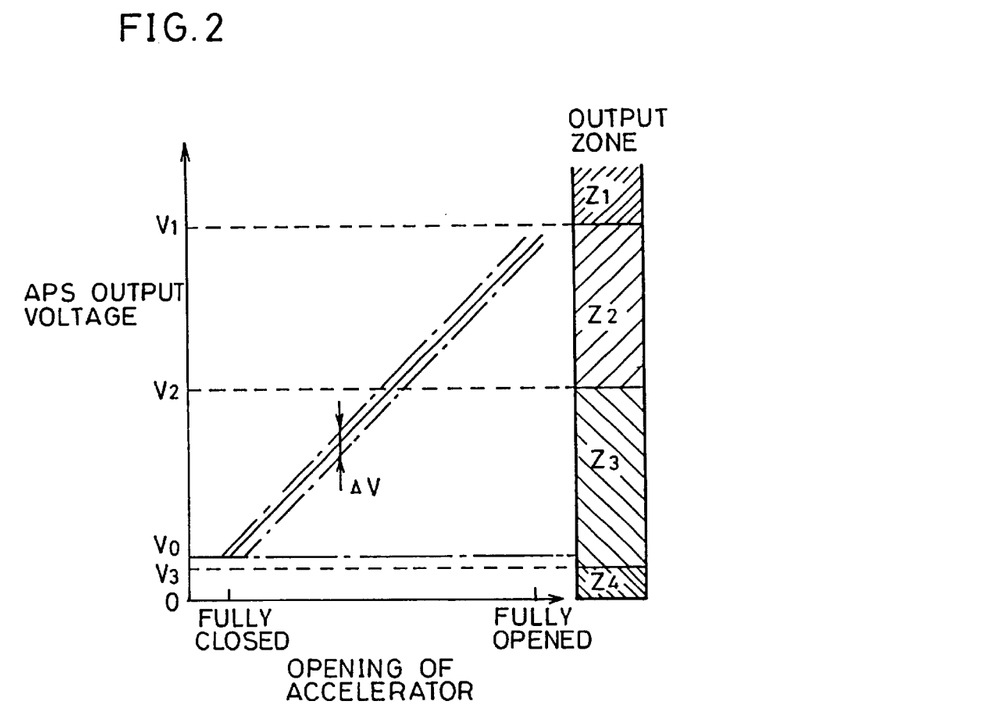
FIG. 2 is a diagram showing the output characteristics of accelerator opening detection means.

FIG. 2 shows the characteristics of the detection voltages of the first and second accelerator opening detection means 11 and 12, that is, APS output voltages with respect to the opening of the accelerator. The APS output voltage increases in proportion to the opening of the accelerator. The installation position of the potentiometer is adjusted so that the output voltage value when the accelerator is fully opened is not "0" but a fixed value $V_0$ (for example, 0.5 V±0.2 V). The APS output voltage characteristics with respect to the opening of the accelerator have a tolerance $\Delta V$ (about 3%). Three reference values—maximum opening voltage $V_1$, stable opening voltage $V_2$ and minimum opening voltage $V_3$ ($V_1 > V_2 > V_0 > V_3$)—are set and the APS output voltage is divided into four output zones Z1 to Z4 (four opening states). In Embodiment 1, the above reference voltages are set as follows. $V_1$ is set at 4.5 V, $V_2$ at 2.5 V, and $V_3$ at 0.2 V.

Z1 is an opening state in which the accelerator opening voltage $V_{aps}$ is larger than $V_1$ and corresponds to a first opening state. Z2 is an opening state in which $V_1 \geq V_{aps} > V_2$. Z3 is an opening state in which $V_2 \geq V_{aps} \geq V_3$ and corresponds to a second opening state. Z4 is an opening state in which $V_3 > V_{aps}$ and corresponds to a third opening state.

When the failure judging means 2 judges that the output voltages of the first accelerator opening detection means 11 and the second accelerator opening detection means 12 for detecting the operation amount of the accelerator are normal, for example, the opening states of $V_{aps1}$ and $V_{aps2}$ are both Z2, the throttle opening control means 3 controls the throttle valve 14 through the throttle drive means 13 such that the actual opening of the throttle valve should agree with the target opening of the throttle valve calculated based on the output signal $V_{aps1}$ of the first accelerator opening detection means 11.

Figure 3:
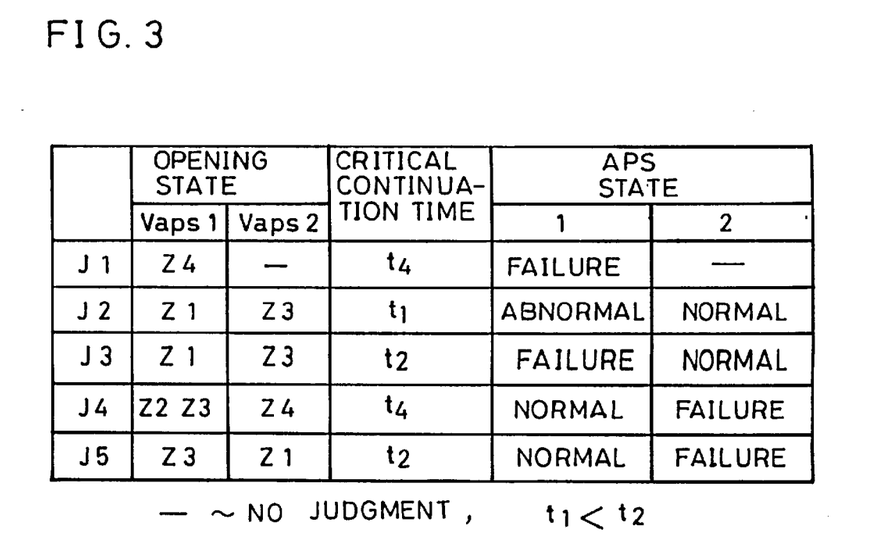
FIG. 3 is a table for judging a failure according to Embodiment 1 of the present invention.
Figure 4:
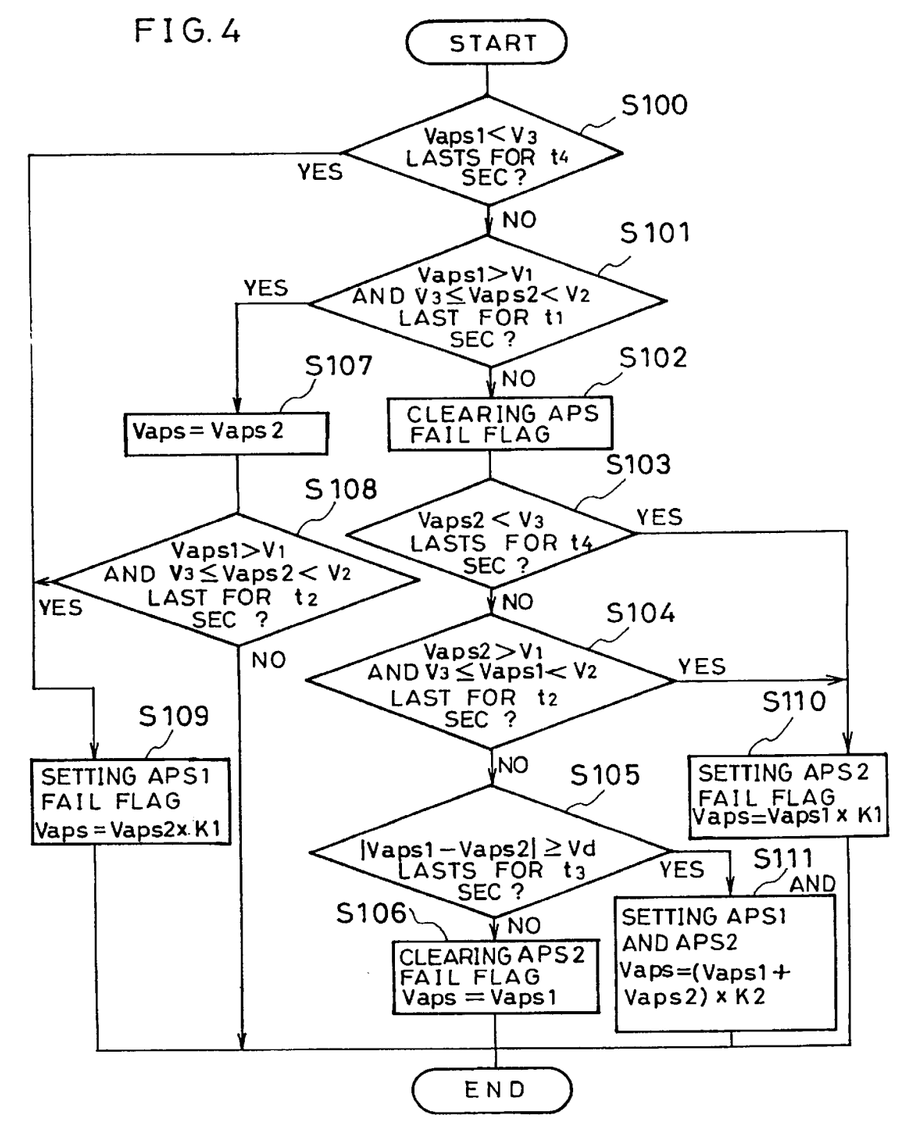
FIG. 4 is a flow chart for judging a failure according to Embodiment 1 of the present invention.

A description is subsequently given of the operation of the device 1 for controlling the volume of intake air for an engine according to Embodiment 1 with reference to the judging table of FIG. 3 and the flow chart of FIG. 4. In FIG. 3, "normal" indicates the result of judgment using opening states alone.

It is first judged whether an opening state (Z4) in which the output voltage $V_{aps1}$ of the first accelerator opening detection means (APS1) 11 is lower than the minimum opening voltage $V_3$ continues for more than a third predetermined time $t_4$ (for example, 1 second) (condition J1 of FIG. 3) (step S100). When the $V_{aps1}$ satisfies the above condition J1, the failure specifying means 2c judges that the above first accelerator opening detection means 11 malfunctions and the routine proceeds to step S109 where an APS1 fail flag is set. The opening value calculation means 2d obtains a value by multiplying the output voltage $V_{aps2}$ of the second accelerator opening detection means (APS2) 12 by a first predetermined correction factor K1 (for example, K1=0.5) as an accelerator opening voltage $V_{aps}$ used for the calculation of a target throttle opening. The throttle opening control means 3 controls the throttle valve 14 through the throttle drive means 13 such that the actual opening of the throttle valve should agree with the target opening of the throttle opening calculated based on the above accelerator opening voltage $V_{aps}$ so as to control the output of the engine.

In the above step S100, when $V_{aps1}$ does not satisfy the above condition J1, it is judged whether an opening state (Z1) in which the output voltage $V_{aps1}$ of the first accelerator opening detection means (APS1) 11 is higher than the maximum opening voltage $V_1$ and an opening state (Z3) in which the output voltage $V_{aps2}$ of the second accelerator opening detection means (APS2) 12 satisfies $V_2 \geq V_{aps2} \geq V_3$ continue for more than a predetermined time $t_1$ (for example, 0.05 second) (condition J2 of FIG. 3) (step S101). When $V_{aps1}$ and $V_{aps2}$ satisfy the above condition J2, the failure specifying means 2c judges that the first accelerator opening detection means 11 is abnormal and the routine proceeds to step S107 where the accelerator opening voltage $V_{aps}$ used for the calculation of the target opening of the throttle valve is switched from the output voltage $V_{aps1}$ of the first accelerator opening detection means (APS1) 11 to the output voltage $V_{aps2}$ of the second accelerator opening detection means (APS2) 12 to prevent an abnormal rise in engine speed and abnormal acceleration of a vehicle in advance.

Figure 5:
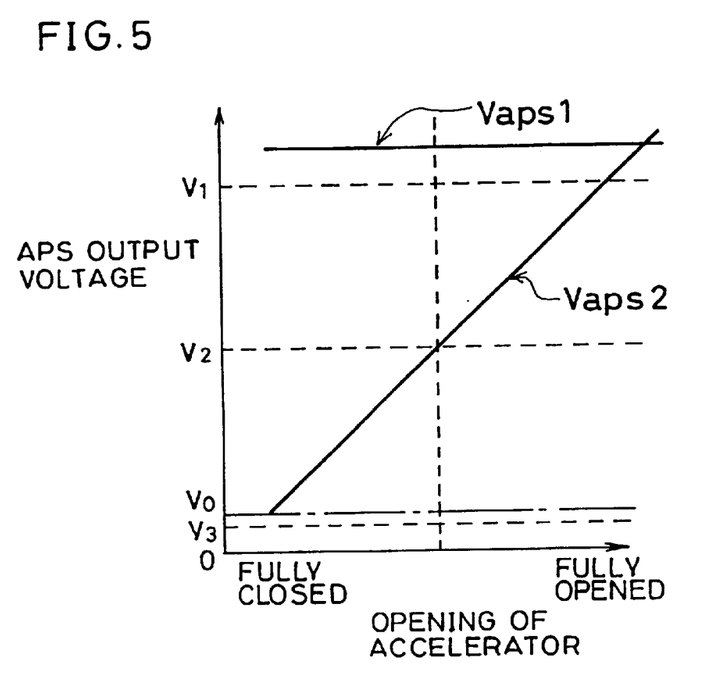
FIG. 5 shows output characteristics when first accelerator opening detection means malfunctions.

Moreover, as shown in FIG. 5, whether $V_{aps1}$ and $V_{aps2}$ satisfy the above condition J2 is monitored, abnormality is judged, it is judged whether the abnormal state continues for more than a second predetermined time $t_2$ (for example, 1 second) (condition J3 of FIG. 3) (step S108), the failure specifying means 2c judges that the first accelerator opening detection means 11 malfunctions when $V_{aps1}$ and $V_{aps2}$ satisfy the above condition J3, and the routine proceeds to step S109 where the accelerator opening voltage $V_{aps}$ used for the calculation of the target opening of the throttle valve is obtained by multiplying $V_{aps2}$ by K1 to control the output of the engine. When the above abnormal state does not continue for more than the second predetermined time $t_2$, the control of the throttle valve 14 based on the output voltage $V_{aps2}$ of the second accelerator opening detection means (APS2) 12 is kept.

In the above step S101, when $V_{aps1}$ and $V_{aps2}$ do not satisfy the above condition J2, it id judged that the above first accelerator opening detection means (APS1) 11 is normal ($V_{aps1}$ is in Z2 or Z3), an APS1 fail flag is cleared (step S102), and the routine proceeds to step S103. The throttle opening control means 3 keeps the operation of controlling the throttle valve 14 based on the output signal $V_{aps1}$ of the first accelerator opening detection means 11, and the failure specifying means 2c judges whether the second accelerator opening detection means 12 malfunctions.

In step S103, it is judged whether an opening state Z4 in which the output voltage $V_{aps2}$ of the second accelerator opening detection means (APS2) 12 is lower than the minimum opening voltage $V_3$ continues for more than a fourth predetermined time equal to the third predetermined time $t_4$ (condition J4 of FIG. 3) (step S103). When $V_{aps2}$ satisfies the above condition J4, the failure specifying means 2c judges that the second accelerator opening detection means 12 malfunctions, and the routine proceeds to step S110 where an APS2 fail flag is set. The opening value calculation means 2d obtains a value by multiplying the output voltage $V_{aps1}$ of the first accelerator opening detection means (APS1) 11 by a second correction factor K2 equal to the above first correction factor K1 as an accelerator opening voltage $V_{aps}$ used for the calculation of the target opening of the throttle valve. The throttle opening control means 3 controls the throttle valve 14 through the throttle drive means 13 such that the actual opening of the throttle valve should agree with the target opening of the throttle valve calculated based on the above accelerator opening voltage $V_{aps}$ so as to control the output of the engine.

In the above step S103, when $V_{aps2}$ does not satisfy the above condition J4, it is judged whether an opening state (Z1) in which the output voltage $V_{aps2}$ of the second accelerator opening detection means (APS2) 12 is higher than the maximum opening voltage $V_1$ and an opening state (Z3) in which the output voltage $V_{aps1}$ of the first accelerator opening detection means (APS1) 11 satisfies $V_2 \geq V_{aps1} \geq V_3$ continue for more than a fifth predetermined time equal to the second predetermined time $t_2$ (condition J5 of FIG. 3) (step S104). When $V_{aps2}$ satisfies the above condition J5, the failure specifying means 2c judges that the second accelerator opening detection means 12 malfunctions, the routine proceeds to step S110 where an APS2 fail flag is set, and the accelerator opening voltage $V_{aps}$ ($V_{aps}=V_{aps1} \times K1$) used for the calculation of the target throttle opening is calculated to control the output of the engine.

In the above step S104, when $V_{aps2}$ does not satisfy the above condition J5, it is judged that the second accelerator opening detection means (APS2) 12 is also normal ($V_{aps2}$ is in Z2 or Z3).

Figure 6:
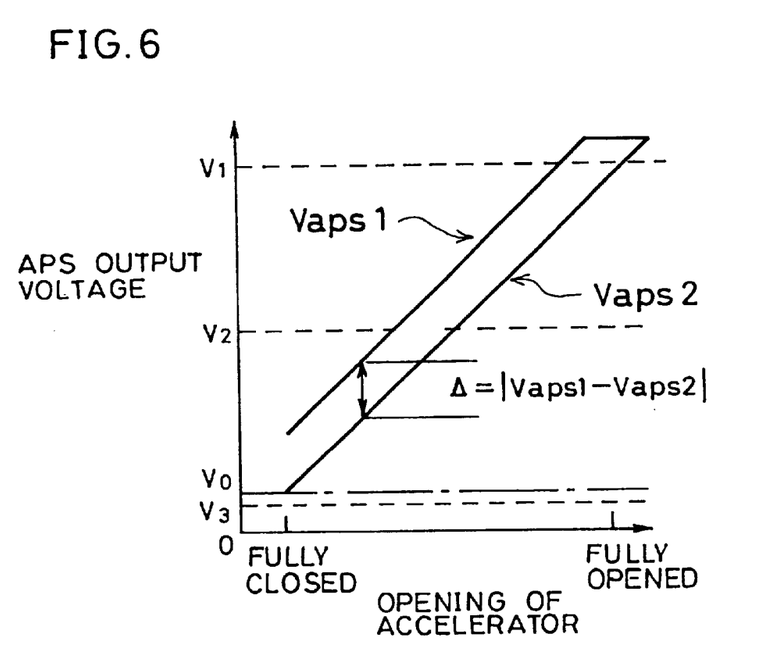
FIG. 6 shows output characteristics when output is abnormal.

In the following step S105, it is judged whether the output characteristics of the first and second accelerator opening detection means 11 and 12 are output properly within the above tolerance as shown in FIG. 6. That is, it is judged whether an output voltage difference $\delta = |V_{aps1} - V_{aps2}|$ between $V_{aps1}$ and $V_{aps2}$ continues to be equal to or larger than a predetermined voltage (Vd in FIG. 4, for example, 1V) for a sixth predetermined time $t_3$ (for example, 4 seconds) (condition J6). When $V_{aps1}$ and $V_{aps2}$ satisfy the above condition J6, the failure specifying means 2c judges that the output characteristics of the first and second accelerator opening detection means 11 and 12 are both abnormal, and APS1 and APS2 fail flags are set. The opening value calculation means 2d obtains a value by multiplying the total value of $V_{aps1}$ and $V_{aps2}$ by a third predetermined correction factor K2 (for example, K2=0.25) as an accelerator opening voltage $V_{aps}$ used for the calculation of the target opening of the throttle valve (step S111). The throttle opening control means 3 controls the throttle valve 14 through the throttle drive means 13 such that the actual opening of the throttle valve should agree with the target opening of the throttle valve so as to control the output of the engine.

In the above step S105, when $V_{aps1}$ and $V_{aps2}$ do not satisfy the above condition J6, the routine proceeds to step S106 where an APS2 fail flag is cleared as the second accelerator opening detection means (APS2) 12 is normal, and the throttle opening control means 3 keeps the operation of controlling the throttle valve 14 based on the output signal $V_{aps1}$ of the first accelerator opening detection means 11.

When a failure of the first accelerator opening detection means 11 or the second accelerator opening detection means 12 is detected, the accelerator opening voltage $V_{aps}$ is limited to a value smaller than a predetermined value to reduce the output of the engine as described above. At the same time, the input switch SW of an unshown alarm lamp provided in front of the driver's seat, for example, is controlled by the failure alarm means 4 to light up the alarm lamp to warn the driver of the failure.

In Embodiment 1, three reference voltage values—maximum opening voltage $V_1$, stable opening voltage $V_2$ and minimum opening voltage $V_3$—are provided ($V_1 > V_2 > V_0 > V_3$), the output voltages $V_{aps1}$ and $V_{aps2}$ of the first and second accelerator opening detection means 11 and 12 are classified into four opening states Z1 to Z4, it is judged which opening state each of the output voltages $V_{aps1}$ and $V_{aps2}$ of the first and second accelerator opening detection means 11 and 12 is in, the continuation time of the opening state of each of the output voltages $V_{aps1}$ and $V_{aps2}$ is set, failures of the first and second accelerator opening detection means 11 and 12 are judged based on the judging conditions J1 to J5 according to the opening states of the output voltages $V_{aps1}$ and $V_{aps2}$ and their continuation times, and the accelerator opening output voltage $V_{aps}$ used for the calculation of the target. opening of the throttle valve is calculated based on the result of the above judgment to control the throttle valve 14. Therefore, an abnormal rise in engine speed and abnormal acceleration of a vehicle can be prevented and safety at the time of emergency driving can be ensured.

In Embodiment 1, three reference voltage values—maximum opening voltage $V_1$, stable opening voltage $V_2$ and minimum opening voltage $V_3$—are set ($V_1 > V_2 > V_0 > V_3$), and the APS output voltages are classified into four opening states Z1 to Z4 so that the opening states of the first and second accelerator opening detection means 11 and 12 are judged. The classification of opening states is not limited to this. For example, a second stable opening voltage $V_4$ which satisfies $V_2 > V_4 > V_0$ is provided to further divide the opening state Z3 into Z31 which satisfies $V_2 \geq V_{aps} > V_4$ and Z32 which satisfies $V_4 \geq V_{aps} \geq V_3$. When $V_{aps}$ of one of the accelerator opening detection means continues to be in Z1 and $V_{aps}$ of the other accelerator opening detection means continues to be in Z32 for the second predetermined time $t_2$, it may be judged that a failure occurs. On the other hand, when $V_{aps}$ of one of the accelerator opening detection means continues to be in Z1 and $V_{aps}$ of the other accelerator opening detection means continues to be in Z31 for the second predetermined time $t_2$, it may be judged that abnormality occurs.

In the failure judgment of the second accelerator opening detection means 12, the fourth predetermined time is made equal to the third predetermined time $t_4$, and the fifth predetermined time is made equal to the second predetermined time $t_2$. However, the condition for judging a failure of the first accelerator opening detection means 11 and the condition for judging a failure of the second accelerator opening detection means 12 do not have to be made the same, and the condition for judging a failure may be suitably set, for example, the condition for judging a failure of the first accelerator opening detection means 11 is made more strict.

The failure alarm means 4 is provided in the device 1 for controlling the volume of intake air for an engine to control the generation of an alarm signal by an alarm lamp or the like. A control signal may be sent from the failure specifying means 2c to the alarm lamp directly installed in a vehicle in advance to warn the driver of a failure of the first accelerator opening detection means 11 or the second accelerator opening detection means 12.

Embodiment 2

In the above Embodiment 1, abnormality in the output characteristics of the first and second accelerator opening detection means 11 and 12 is judged based on an output voltage difference $|V_{aps1}-V_{aps2}|$ between $V_{aps1}$ and $V_{aps2}$ alone. In Embodiment 2, as a condition for judging abnormality in the output characteristics, it is judged whether the output voltage difference $|V_{aps1}-V_{aps2}|$ continues to be equal to or larger than a predetermined voltage (for example, 1V) and either one or both of a variation width in $V_{aps1}$ and a variation width in $V_{aps2}$ continue(s) to be equal to or smaller than a predetermined value (for example, 20 V/sec) for a seventh predetermined time $t_5$ (for example, 1 sec) (condition J7). Therefore, the time for judging abnormality in the output characteristics can be shortened and judging accuracy can be improved.

As described above, the method for controlling the volume of intake air for an engine according to the first aspect of the present invention comprises judging which one of a plurality of opening states classified according to a plurality of preset reference voltages the output of each of the first and second accelerator opening detection means for detecting the opening of the accelerator is in and controlling the opening of the throttle valve based on an output value of the second accelerator opening detection means in place of an output value of the first accelerator opening detection means when a continuation time during which the output of the first accelerator opening detection means is in an opening state higher than a predetermined first opening state and the output of the second accelerator opening detection means is in a second opening state lower than the first opening state reaches a predetermined reference time. Therefore, an abnormal rise in engine speed and abnormal acceleration of a vehicle can be prevented and safety at the time of emergency driving can be ensured.

In the device for controlling the volume of intake air for an engine according to the second aspect of the present invention which comprises failure judging means for judging failures of the first accelerator opening detection means and the second accelerator opening detection means for detecting the opening of the accelerator and throttle control means for controlling the throttle valve for adjusting the volume of intake air for an engine to a target opening based on an output value of the first accelerator opening detection means, the above failure judging means comprises opening judging means for judging which one of a plurality of opening states classified according to a plurality of preset reference voltages the output of each of the first and second accelerator opening detection means is in and continuation time judging means for judging the continuation time of the opening state of the output of each of the first and second accelerator opening detection means reaches a preset reference time, and the throttle control means controls the opening of the throttle valve based on an output value of the second accelerator opening detection means in place of an output value of the first accelerator opening detection means when a continuation time during which the output of the first accelerator opening detection means is in an opening state higher in voltage than a first predetermined opening state and the output of the second accelerator opening detection means is in a second opening state lower in voltage than the first opening state reaches the above reference time. Therefore, abnormality in the output of the first accelerator opening detection means can be detected in a short period of time, an abnormal rise in engine speed and abnormal acceleration of a vehicle caused by transient noise input can be prevented, and switch to the control of the throttle valve based on an output value of normal accelerator opening detection means can be carried out smoothly.

In the device for controlling the volume of intake air for an engine according to the third aspect of the present invention, a second reference time longer than the above reference time is provided in the failure judging means so that it is judged that the first accelerator opening detection means malfunctions when a continuation time during which the output of the first accelerator opening detection means is in an opening state higher than the first opening state and the output of the second accelerator opening detection means is in the above second opening state reaches the above second reference time. Therefore, a failure of the first accelerator opening detection means can be judged without fail, and a rise in engine speed and abnormal acceleration of a vehicle can be prevented.

In the device for controlling the volume of intake air for an engine according to the fourth aspect of the present invention, a third reference time is provided in the failure judging means so that it is judged that the first accelerator opening detection means malfunctions when a continuation time during which the output of the first accelerator opening detection means is in an opening state lower than the third opening state which is lower than the second opening state reaches the above third reference time. Therefore, the judgment of a failure causing a reduction in the output of a sensor such as a contact failure in the connector of a sensor output signal system, harness disconnection, a defect in an input interface circuit or the like can be carried out easily, and a quick speed reduction of a vehicle, an engine failure and the like can be prevented.

In the device for controlling the volume of intake air for an engine according to the fifth aspect of the present invention, when the failure judging means judges that the first accelerator opening detection means malfunctions, the throttle control means controls the opening of the throttle valve based on a value obtained by multiplying an output value of the second accelerator opening detection means by a preset correction factor. Therefore, the output of an engine at the time of emergency driving can be reduced, a driver can be warned of a reduction in maneuverability, and safety at the time of emergency driving can be ensured.

In the device for controlling the volume of in-take air for an engine according to the sixth aspect of the present invention, a fourth reference time is provided in the failure judging means so that it is judged that the second accelerator opening detection means malfunctions when a continuation time during which the output of the second accelerator opening detection means is in a opening state higher than the first opening state and the output of the first accelerator opening detection means is in the above second opening state reaches the above fourth reference time. Therefore, a failure of the second accelerator opening detection means can be judged without fail.

In the device for controlling the volume of intake air for an engine according to the seventh aspect of the present invention, a fifth reference time is provided in the failure judging means so that it is judged that the second accelerator opening detection means malfunctions when a continuation time during which the output of the second accelerator opening detection means is in a opening state lower than the third opening state which is lower than the second opening state reaches the above fifth reference time. Therefore, the judgment of a failure causing a reduction in sensor output of the second accelerator opening detection means can be carried out without fail.

In the device for controlling the volume of intake air for an engine according to the eighth aspect of the present invention, when the failure judging means judges that the second accelerator opening detection means malfunctions, the throttle control means controls the opening of the throttle valve based on a value obtained by multiplying an output value of the first accelerator opening detection means by a second preset correction factor. Therefore, the output of the engine at the time of emergency driving is reduced, a driver can be warned of a reduction in maneuverability, and safety at the time of emergency driving can be ensured.

In the device for controlling the volume of intake air for an engine according to the ninth aspect of the present invention, a reference output difference and a sixth reference time are provided in the failure judging means so that it is judged that both the first and second accelerator opening detection means are abnormal when a continuation time during which an output value of the first accelerator opening detection means and an output value of the second accelerator opening detection means are both in the above second opening state and a difference between the output value of the first accelerator opening detection means and the output value of the second accelerator opening detection means is equal to or larger than the above reference output difference reaches the above sixth reference time, and the opening of the throttle valve is controlled based on a value obtained by multiplying the total of the output value of the first accelerator opening detection means and the output value of the second accelerator opening detection means by a third preset correction factor. Therefore, the output of the engine at the time of emergency driving can be reduced, a driver can be warned of a reduction in maneuverability, and safety at the time of emergency driving can be ensured.

In the device for controlling the volume of intake air for an engine according to the tenth aspect of the present invention, a reference output difference, a reference output value variation width and a seventh reference time are provided in the failure judging means so that it is judged that both the first and second accelerator opening detection means are abnormal when a continuation time during which an output value of the first accelerator opening detection means and an output value of the second accelerator opening detection means are both in the second opening state, a difference between the output value of the first accelerator opening detection means and the output value of the second accelerator opening detection means is equal to or larger than the above reference output difference, and one or both of the output value variation width of the first accelerator opening detection means and the output value variation width of the second accelerator opening detection means is/are equal to or smaller than the above reference output value variation width reaches the above seventh reference time, and the opening of the throttle valve is controlled based on a value obtained by multiplying the total of the output value of the first accelerator opening detection means and the output value of the second accelerator opening detection means by the third preset correction factor. Therefore, the output of the engine at the time of emergency driving can be reduced, a driver can be warned of a reduction in maneuverability, and safety at the time of emergency driving can be ensured.

In the device for controlling the volume of intake air for an engine according to the eleventh aspect of the present invention, the above reference voltage is divided into a maximum opening voltage, stable opening voltage and minimum opening voltage, the first opening state is a state in which voltage is higher than the above maximum opening voltage, the second opening state is a state in which voltage is higher than the above minimum opening voltage and lower than the stable opening voltage, and the third opening state is a state in which voltage is lower than the minimum opening voltage. Therefore, failures of the accelerator opening detection means can be judged with the smallest number of reference voltages, and the judging time can be minimized.

In the device for controlling the volume of intake air for an engine according to the twelfth aspect of the present invention, failure alarm means is provided to generate an alarm signal by an alarm lamp or the like so that a driver is warned of a failure of the first accelerator opening detection means or the second accelerator opening detection means. Therefore, it is possible to prevent the driver from being confused by a reduction in maneuverability due to the operation of controlling the output of the engine at the time of a failure and safety at the time of emergency driving can be ensured.

What is claimed is:

1. A device for controlling the volume of intake air for an engine comprising:

failure judging means for judging failures of first accelerator opening detection means and second accelerator opening detection means for detecting the opening of an accelerator; and throttle control means for controlling a throttle valve for adjusting the volume of intake air for an engine to a target opening based on an output value of the first accelerator opening detection means, wherein the failure judging means comprises opening judging means for judging which one of a plurality of opening states classified according to a plurality of preset; reference voltages the output of each of the first and second accelerator opening detection means is in and continuation time judging means for judging the continuation time of the opening state of the output of each of the first and second accelerator opening detection means reaches a preset reference time, and the throttle control means controls the opening of the throttle valve based on an output value of the second accelerator opening detection means in place of an output value of the first accelerator opening detection means when a continuation time during which the output of the first accelerator opening detection means is in an opening state higher in voltage than a first predetermined opening state and the output of the second accelerator opening detection means is in a second opening state lower in voltage than the first opening state reaches the reference time.

2. The device for controlling the volume of intake air for an engine according to claim 1, wherein a second reference time longer than the reference time is provided in the failure judging means so that it is judged that the first accelerator opening detection means malfunctions when a continuation time during which the output of the first accelerator opening detection means is in an opening state higher than the first opening state and the output of the second accelerator opening detection means is in the second opening state reaches the second reference time.

3. The device for controlling the volume of intake air for an engine according to claim 2, wherein when the failure judging means judges that the first accelerator opening detection means malfunctions, the throttle control means controls the opening of the throttle valve based on a value obtained by multiplying an output value of the second accelerator opening detection means by a preset correction factor.

4. The device for controlling the volume of intake air for an engine according to claim 2, wherein a third reference time is provided in the failure judging means so that it is judged that the first accelerator opening detection means malfunctions when a continuation time during which the output of the first accelerator opening detection means is in an opening state lower than a third opening state which is lower in voltage than the second opening state reaches the third reference time.

5. The device for controlling the volume of intake air for an engine according to claim 1, wherein a fourth reference time is provided in the failure judging means so that it is judged that the second accelerator opening detection means malfunctions when a continuation time during which the output of the second accelerator opening detection means is in an opening state higher than the first opening state and the output of the first accelerator opening detection means is in the second opening state reaches the fourth reference time.

6. The device for controlling the volume of intake air for an engine according to claim 5, wherein when the failure judging means judges that the second accelerator opening detection means malfunctions, the throttle control means controls the opening of the throttle valve based on a value obtained by multiplying an output value of the first accelerator opening detection means by a second preset correction factor.

7. The device for controlling the volume of intake air for an engine according to claim 2, wherein a fifth reference time is provided in the failure judging means so that it is judged that the second accelerator opening detection means malfunctions when a continuation time during which the output of the second accelerator opening detection means is in an opening state lower than a third opening state which is lower in voltage than the second opening state reaches the fifth reference time.

8. The device for controlling the volume of intake air for an engine according to claim 1, wherein a reference output difference and a sixth reference time are provided in the failure judging means so that it is judged that both the first and second accelerator opening detection means are abnormal when a continuation time during which an output value of the first accelerator opening detection means and an output value of the second accelerator opening detection means are both in the second opening state and a difference between the output value of the first accelerator opening detection means and the output value of the second accelerator opening detection means is equal to or larger than the reference output difference reaches the sixth reference time, and the opening of the throttle valve is controlled based on a value obtained by multiplying the total of the output value of the first accelerator opening detection means and the output value of the second accelerator opening detection means by a third preset correction factor.

9. The device for controlling the volume of intake air for an engine according to claim 1, wherein a reference output difference, a reference output value variation width and a seventh reference time are provided in the failure judging means so that it is judged that both the first and second opening detection means are abnormal when a continuation time during which an output value of the first accelerator opening detection means and an output value of the second accelerator opening detection means are both in the second opening state, a difference between the output value of the first accelerator opening detection means and the output value of the second accelerator opening detection means is equal to or larger than the reference output difference, and one or both of the output value variation width of the first accelerator opening detection means and the output value variation width of the second accelerator opening detection means is/are equal to or smaller than the output value variation width reaches the seventh reference time, and the opening of the throttle valve is controlled based on a value obtained by multiplying the total of the output value of the first accelerator opening detection means and the output value of the second accelerator opening detection means by a third preset correction factor.

10. The device for controlling the volume of intake air for an engine according to claim 1, wherein the reference voltage is divided into a maximum opening voltage, stable opening voltage and minimum opening voltage, the first opening state is a state in which voltage is higher than the maximum opening voltage, the second opening state is a state in which voltage is higher than the minimum opening voltage and lower than the stable opening voltage, and the third opening state is a state in which voltage is lower than the minimum opening voltage.

11. The device for controlling the volume of intake air for an engine according to claim 1, wherein failure alarm means is provided.

12. A method for controlling the volume of intake air for an engine which comprises:

judging which one of a plurality of opening states classified according to a plurality of preset reference voltages the output of each of first and second accelerator opening detection means for detecting the opening of an accelerator is in; and controlling the opening of a throttle valve based on an output value of the second accelerator opening detection means in place of an output value of the first accelerator opening detection means when a continuation time during which the output of the first accelerator opening detection means is in an opening state higher in voltage than a first predetermined opening state and the output of the second accelerator opening detection means is in a second opening state lower in voltage than the first opening state reaches a preset reference time.

* * * * *